United States Patent
Hsieh et al.

(10) Patent No.: US 6,649,182 B2
(45) Date of Patent: Nov. 18, 2003

(54) PLANTING METHOD AND BIODEGRADABLE MATERIAL FOR PREVENTING PESTS

(75) Inventors: Shih-Pan-Yu Hsieh, Taichung (TW); Rui-Zhi Huang, Taoyuan (TW)

(73) Assignee: Yuen Foong Yu Paper Mfg. Co., Ltd. (TW)

( * ) Notice: Subject to any disclaimer, the term of this patent is extended or adjusted under 35 U.S.C. 154(b) by 0 days.

(21) Appl. No.: 09/818,434

(22) Filed: Mar. 27, 2001

(65) Prior Publication Data

US 2002/0172704 A1 Nov. 21, 2002

(51) Int. Cl.$^7$ ................................................. A01N 25/32
(52) U.S. Cl. ..................... 424/406; 424/405; 424/407; 424/410; 424/411; 424/412; 424/413; 424/414; 424/420; 514/517
(58) Field of Search ................. 424/403–405, 424/407, 409–414, 416, 84, 78.09, 420; 514/578, 517, 708, 772.3; 504/116; 47/63, 64, 17, 58, 73, 74

(56) References Cited

U.S. PATENT DOCUMENTS 3,090,723 A  * 5/1963  Pastac ........................ 167/46
5,162,349 A  * 11/1992 Beriger et al. ............... 514/363
5,951,995 A  * 9/1999  Adamoli, Jr. et al. ........ 424/408

OTHER PUBLICATIONS

Roll Lawn; Planters Paper Stokes Catalog, 1998.*
Less Toxic: Snails & Slugs, Feb. 2000.*

* cited by examiner

Primary Examiner—Neil S. Levy
(74) Attorney, Agent, or Firm—Mathews, Collins, Shepherd & McKay, P.A.

(57) ABSTRACT

A planting method for preventing pests, especially snails, is disclosed. The method includes the steps of (a) providing a biodegradable material, (b) adding a pesticide into the biodegradable material, and (c) spreading the pesticide-added biodegradable material on a plant-growing substrate. Therefore, a plant growing on the plant-growing substrate will not undergo the damage of pests.

7 Claims, No Drawings

PLANTING METHOD AND BIODEGRADABLE MATERIAL FOR PREVENTING PESTS

FIELD OF THE INVENTION

The present invention relates to a planting method and a biodegradable material for preventing pests, and especially to a planting method and a biodegradable material for preventing snails from generating in a low land rice field.

BACKGROUND OF THE INVENTION

The damages of pests and weeds are two biggest problems for the agricultural management nowadays. Especially after the golden apple snail (*Pomacea canaliculata* (Lamarck)) was wrongly introduced into Taiwan, the balance of ecological environment is seriously affected. The golden apple snail mainly inhabits in aquatic environment, is polyphagia and has a very high multiplication rate. Once introduced into the paddy field the rice seedlings are serious damage and resulted in yield reduction. Conventionally, the pesticide used for control the snail is fentin acetate, but the soil of the rice field will also be contaminated with heavy metals. Therefore, the business of the greatest urgency at present is to find an alternate method for preventing snails.

In addition, the expendable goods used for agricultural production are usually made of plastic. Although plastic is cheap and convenient, it is non-biodegradable. To protect our environment, the usage of plastic should be limited. Thus, it is important to provide a biodegradable material for agricultural production.

It is therefore attempted by the applicant to deal with the above situation encountered with the prior art.

SUMMARY OF THE INVENTION

An object of the present invention is to provide a planting method for preventing pests growing, and to provide a biodegradable material which can prevent pests and weeds growing thereon.

Another object of the present invention is to provide a planting method for preventing pests, particularly snails, from generating in a paddy rice field.

The planting method of the present invention includes the steps of (a) providing a biodegradable material, (b) adding a pesticide into the biodegradable material, and (c) spreading the pesticide-added biodegradable material on a plant-growing substrate. Therefore, a plant growing on the plant-growing substrate will not undergo the damage of pests.

The pesticide of the present invention is preferably sodium dodecyl sulfate (SDS), linear alkyl sulfonate (LAS), or an agricultural waste containing saponin. The saponin-containing agricultural waste is preferably methyl alcohol extracted from seeds of bitter tea or tobacco powder.

The biodegradable material of the present invention is preferably paper mats, non-twine cloths, or films made of biodegradable polymers.

According to the present invention, SDS is added into the biodegradable material by spraying, or by the steps of (a) mixing SDS with a glue to form a glutinous solution, (b) daubing the glutinous solution on the biodegradable material, and (c) air-drying SDS-added biodegradable material. Preferably, the glue is carboxymethyl cellulose sodium salt (CMC), and SDS is added into the biodegradable material with a dosage larger than 100 ppm, preferably ranged from 500 ppm to 10000 ppm.

DETAILED DESCRIPTION OF THE PREFERRED EMBODIMENTS

The present invention provides a planting method for preventing pests. The method includes the steps of (a) providing a biodegradable material, (b) adding at least one kind of pesticide which can kill pests or inhibit the growth of pests into said biodegradable material, and (c) spreading said pesticide-added biodegradable material on a plant-growing substrate. Therefore a plant growing on said plant-growing substrate will not undergo the damage of pests. In addition, the biodegradable material is preferably paper mats, non-twine cloths, or films made of biodegradable polymers. The biodegradable material should be non-transparency and can prevent the growth of weeds. The pesticide is preferably sodium dodecyl sulfate (SDS), linear alkyl sulfonate (LAS), or an agricultural waste containing saponin. The saponin-containing agricultural waste is preferably methyl alcohol extracted from seeds of bitter tea or tobacco powder. The thickness of the biodegradable material is ranged from 0.2 mm to 0.3 mm.

The following is an example of the planting method for preventing snails from generating in an aquatic rice field by using a SDS-added paper mat according to the present invention.

SDS is a deadly contact poison which can kill the eggs, newly hatched and adult snails so as to effectively protect the rice field. By adding SDS in paper mats and spreading the SDS-added paper mats on the soil of rice field, snails are killed without polluting the soil. SDS is added into the paper mat by the following steps. At first, 250 g SDS is mixed with 20 g carboxymethyl cellulose sodium salt (CMC) in 1-liter water to form a glutinous solution. Carboxymethyl cellulose sodium salt (CMC) is used as a glue for allowing SDS to attach on the paper mat. Then, the solution is smoothly daubed on a pre-trimmed paper mat by a paintbrush, and every 1 $m^3$ of paper mats needs to use the solution of 400 c.c. (or every 1 $cm^2$ of paper mats needs to use 0.01 g SDS) Finally, the SDS-added paper mats are air-dried naturally, and spread on the paddy rice field. Further, since CMC is water-soluble, SDS can also be added into the paper mats by spraying the glutinous solution thereon. After the SDS-added paper mats are placed on soil surface and immersed into the water of paddy field, SDS will also be dissolved into the soil.

Experiment

The glutinous solutions with different SDS densities (100, 500, 1000, 2000, 5000, 7500, and 10000 ppm) are prepared in advance, and the paper mat made by YUEN FOONG YU PAPER MFG Co., Ltd is also cut into many round boards having a diameter of 9 cm.

The test is done by the following steps. At first, each of the round boards is dripped with 2 ml of one of the glutinous solutions respectively. The round boards are dried in an oven at a temperature of 30° C. Then, the soil taken from the paddy field is added with water to simulate the natural environment. Each of the dried SDS-added round boards is bedded on 50 g of the wet soil in a Petri dish respectively. Finally, each of the dishes is added with 10 ml water and put 10 golden apple snails thereon.

Two other groups are prepared for comparison. One group (no-mat group) does not have a round board on the soil, and the other group (clean group) has a clean round board (non-SDS-added) on the soil. All the three groups are observed in a greenhouse. The results are compared in Table 1 and Table 2.

TABLE 1

Hurting rate and death rate of the golden apple snail (*Pomacea canaliculata* (Lamarck))

| | Conc. of SDS Solution (ppm) | Hurting Rate (%) | Death Rate (%) |
|---|---|---|---|
| Test group | 100 | 3.33* | 0.00 |
| | 500 | 6.67 | 3.33 |
| | 1000 | 23.33 | 10.00 |
| | 2000 | 20.00 | 10.00 |
| No-mat group | | 0.00 | 0.00 |
| Clean group | | 0.00 | 0.00 |

1. The size of golden apple snail: $3.28 \pm 0.43$ g/per snail.
2. "Hurting" means that the snail is dead, shell-fallen, muscle-bound or out of wriggle.
3. This table shows an average value after the snails are treated for three days.
*According to the data of Duncan's multiple range test, $p = 0.05$.

TABLE 2

Hurting rate and death rate of the golden apple snail (*Pomacea canaliculata* (Lamarck))

| | Conc. of SDS Solution (ppm) | Hurting Rate (%) | Death Rate (%) |
|---|---|---|---|
| | 2500 | 100.00* | 100.00 |
| | 5000 | 100.00 | 100.00 |
| | 7500 | 100.00 | 100.00 |
| | 10000 | 100.00 | 100.00 |
| No-mat group | | 0.00 | 0.00 |
| Clean group | | 0.00 | 0.00 |

1. The size of golden apple snail: $0.82 \pm 0.26$ g/per snail.
2. "Hurting" means that the snail is dead, shell-fallen, muscle-bound or out of wriggle.
3. This table shows an average value after the snails are treated for three days.
*According to the data of Duncan's multiple range test, $p = 0.05$.

From Table 1, it is shown that the hurting rate for the bigger snails is about 20.00% under 2000 ppm SDS. From Table 2, it is shown that the hurting rate for the smaller snails is almost 100.00% under SDS concentrations above 2500 ppm. Therefore, the interface activity agent used in the present invention—sodium dodecyl sulfate (SDS)—is a very effective and valuable molluscicide and this molluscicide does not have any undesirable effect for the growth of rice. SDS can also be used with chemical fertilizers or lime together.

Besides SDS, other popular interface activity agents can also be used, such as linear alkyl sulfonate (LAS), and an agricultural waste containing saponin, like methyl alcohol extracted from seeds of bitter tea or tobacco powder. Importantly, all of these interface activity agents are biodegradable.

The biodegradable material used in the present invention, such as paper mats, can prevent the growth of weeds. Therefore, while using with the above disclosed interface activity agents, the snails and pests are killed with a limited impact on the environment.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A planting method for preventing snails, comprising steps of (a) providing a pesticide free mat film of biodegradable material being one selected from a group consisting of paper mats, non-twin cloths, and films made of biodegradable polymers;

(b) adding sodium dodecyl sulfate with a dosage range larger than 100 ppm to 10,000 ppm into said pesticide free mat film as the only pesticidal ingredient; and (c) spreading said sodium dodecyl sulfate-added mat film on a plant-growing substrate;

thereby a plant growing on said plant-growing substrate will not undergo the damage of snails.

2. The method according to claim 1, wherein said sodium dodecyl sulfate is added into said mat film by spraying.

3. The method according to claim 1, wherein said sodium dodecyl sulfate is added into said mat film by steps of:

(a) mixing said sodium dodecyl sulfate with a glue to form a mixture;

(b) daubing said mixture are on said mat film; and (c) air-drying said sodium dodecyl sulfate added mat film.

4. The method according to claim 1, wherein said glue is carboxymethyl cellulose sodium salt (CMC).

5. The method according to claim 1, wherein said dosage is preferably ranged from 0.2 mm to 0.3 mm.

6. The method according to claim 1, wherein said mat film has a thickness ranged from 0.2 mm to 0.3 mm.

7. The method according to claim 1, wherein said mat film can prevent the growth of weeds.

* * * * *